(12) United States Patent
Hattori et al.

(10) Patent No.: US 11,677,291 B2
(45) Date of Patent: Jun. 13, 2023

(54) MOTOR INCLUDING SEALING STRUCTURE BETWEEN A COVER AND A HOUSING

(71) Applicant: Nidec Corporation, Kyoto (JP)

(72) Inventors: Takashi Hattori, Kyoto (JP); Yuichi Nishikawa, Kyoto (JP); Takao Atarashi, Kyoto (JP); Yuki Hamada, Kyoto (JP); Yu Kuwamoto, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 0 days.

(21) Appl. No.: 17/715,996

(22) Filed: Apr. 8, 2022

(65) Prior Publication Data
US 2022/0231564 A1    Jul. 21, 2022

Related U.S. Application Data

(63) Continuation of application No. 16/785,774, filed on Feb. 10, 2020, now abandoned.

(30) Foreign Application Priority Data

Mar. 28, 2019    (JP) .............................. JP2019-063484

(51) Int. Cl.
*H02K 5/10*    (2006.01)

(52) U.S. Cl.
CPC ..................... *H02K 5/10* (2013.01)

(58) Field of Classification Search
CPC .. H02K 5/10; H02K 5/12; H02K 5/22; H02K 5/225; H02K 11/00; H02K 11/30; H02K 11/33
See application file for complete search history.

(56) References Cited

U.S. PATENT DOCUMENTS

2014/0085839 A1*  3/2014  Nakano ................. H05K 5/061
                                                              361/752
2016/0218583 A1*  7/2016  Hayashi ................ H02K 11/33
(Continued)

FOREIGN PATENT DOCUMENTS

JP    2003-258443 A    9/2003
JP    2003-347442 A    12/2003
(Continued)

OTHER PUBLICATIONS

Chiba et al., machine translation of WO2018151064, Aug. 2018 (Year: 2018).*

(Continued)

*Primary Examiner* — Eric Johnson
(74) *Attorney, Agent, or Firm* — Keating & Bennett

(57) ABSTRACT

A motor includes a motor main body including a rotor and a stator, a housing that houses the motor main body, a controller that is located above the motor main body o controls rotation of the rotor, and a cover that surrounds the controller from a radially outer side. The housing includes a cover joint that is annular and surrounds the controller when viewed in an axial direction. The cover includes a cylindrical portion that surrounds the cover joint from an outside in a radial direction. The cover joint includes a contact portion that contacts a surface of the cylindrical portion in the radial direction and an adhesive joint that is bonded with the cylindrical portion via an adhesive in the radial direction. The contact portion and the adhesive joint are adjacent each other in a circumferential direction.

17 Claims, 7 Drawing Sheets

(56) References Cited

U.S. PATENT DOCUMENTS

2017/0005539 A1* 1/2017 Yamasaki ............... H02K 5/02
2020/0156696 A1 5/2020 Hara et al.

FOREIGN PATENT DOCUMENTS

JP 2019-009958 A 1/2019
WO WO-2018151064 A1 * 8/2018 ............. B29C 65/48

OTHER PUBLICATIONS

Hattori et al., "Motor Including Sealing Structure", U.S. Appl. No. 16/785,774, filed Feb. 10, 2020.
Official Communication issued in corresponding Japanese Patent Application No. 2019-063484, drafted on Jan. 13, 2023.

* cited by examiner

MOTOR INCLUDING SEALING STRUCTURE BETWEEN A COVER AND A HOUSING

CROSS REFERENCE TO RELATED APPLICATION

The present application is a Continuation of U.S. application Ser. No. 16/785,774, filed on Feb. 10, 2020, which claims priority under 35 U.S.C. § 119 to Japanese Application No. 2019-063484, filed on Mar. 28, 2019, the entire contents of which are hereby incorporated herein by reference.

1. FIELD OF THE INVENTION

The present disclosure relates to a motor.

2. BACKGROUND

Conventionally, in a motor that needs to be waterproof and drip-proof, a method of fixing the cover member and the housing using an adhesive for fixing is known. For example, in a joint between the housing and the cover member, a configuration is known in which an end of the cover member is inserted into an adhesive groove filled with an adhesive.

In the case where the adhesive groove is provided in the housing, the adhesive groove itself needs to have a width in which the end of the cover member can be inserted, and the outside of the adhesive groove needs to be thick. Therefore, there has been a problem that the outer shape of the motor becomes large.

SUMMARY

According to an example embodiment of the present disclosure, a motor includes a motor main body including a rotor and a stator, the rotor and the stator being centered on a central axis extending in an up-down direction, a housing that houses the motor main body, a controller that is located above the motor main body to control rotation of the rotor, and a cover that surrounds the controller from a radially outer side. The housing includes a cover joint that is annular and surrounds the controller when viewed in an axial direction. The cover includes a cylindrical portion that surrounds the cover joint from an outside in a radial direction. The cover joint includes a contact portion that comes into contact with a surface of the cylindrical portion in the radial direction and an adhesive joint that is bonded with the cylindrical portion via an adhesive in the radial direction. The contact portion and the adhesive joint are adjacent each other in a circumferential direction.

The above and other elements, features, steps, characteristics and advantages of the present disclosure will become more apparent from the following detailed description of the example embodiments with reference to the attached drawings.

DETAILED DESCRIPTION

Figure 1:
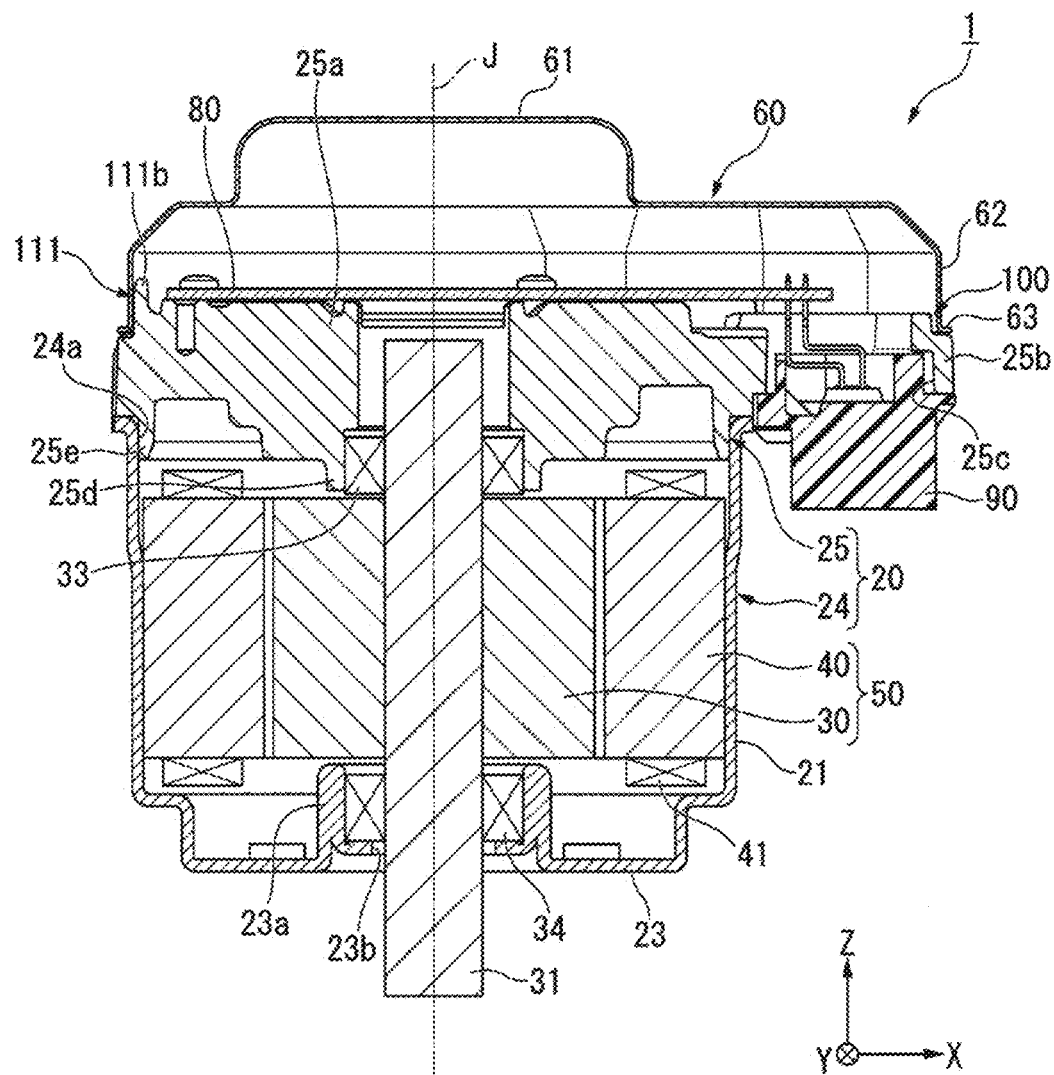
FIG. 1 is a sectional view of a motor according to an example embodiment of the present disclosure.

Hereinafter, example embodiments of the present disclosure will be described with reference to the drawings. In the following description, a direction parallel to the axial direction of the central axis J in FIG. 1 is referred to as a Z-axis direction. An X-axis direction is assumed to be a direction perpendicular to the Z-axis direction. A Y-axis direction is assumed to be a direction perpendicular to both the X-axis direction and the Z-axis direction. A positive side (+Z side) in the Z-axis direction is defined as an 'upper side' and a negative side (−Z side) in the Z-axis direction is defined as a 'lower side'. It should be noted that the definitions of the upper side and the lower side are made simply for the sake of description, and are not meant to restrict actual relative positions or directions. Also, unless otherwise explained, a direction parallel to the central axis J (Z-axis direction) is simply referred to as 'axial direction,' a radial direction having its center on the central axis J is simply referred to as 'radial direction,' and a circumferential direction having its center on the central axis J, that is, the axial circumference of central axis J, is simply referred to as 'circumferential direction.' Further, in the present specification, a direction indicating the inside and outside of the housing 20 in a plane perpendicular to the central axis J may be simply referred to as a "radial direction", and a direction of orbiting the housing 20 in a plane perpendicular to the central axis J may be simply referred to as a "circumferential direction".

Figure 2:
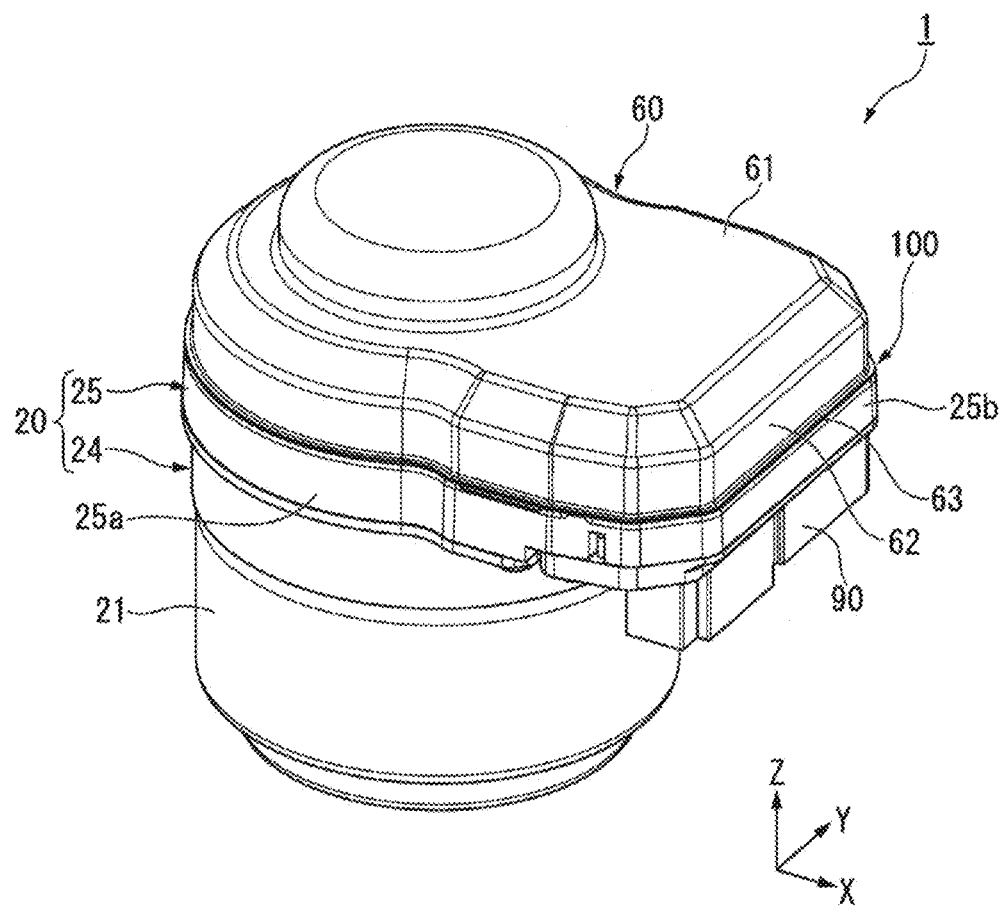
FIG. 2 is a perspective view of a motor according to an example embodiment of the present disclosure.

As shown in FIGS. 1 and 2, a motor 1 includes a housing 20, a motor main body 50, an upper bearing 33, a lower bearing 34, a cover 60, a controller 80, and a connector 90.

The motor main body 50 includes a rotor 30 that rotates about a central axis J extending in the up-down direction, and a stator 40 having a coil 41. The housing 20 has a lower housing 24 that houses the rotor 30 and the stator 40, and an upper housing 25 that is located above the lower housing 24.

The controller 80 is arranged on the upper surface of the upper housing 25. In the present example embodiment, the controller 80 is a control board that extends in a direction intersecting with the axial direction. Various electronic elements are mounted on the control board as the controller 80. The controller 80 is electrically connected to a coil wire, not shown, extending from the stator 40.

The lower housing 24 has a cylindrical portion 21 that extends in the up-down direction, a bottom wall portion 23 located at a lower end of the cylindrical portion 21, and an opening 24a that opens upward. The stator 40 is fixed to an inner surface of the housing 20.

In the case of the present example embodiment, the cylindrical portion 21 has a cylindrical shape centered on the central axis J. The shape of the cylindrical portion 21 is not limited to a cylindrical shape, and may be, for example, a polygonal cylindrical shape. The bottom wall portion 23 is located below the stator 40. The bottom wall portion 23 has a bearing holder 23a that holds the lower bearing 34, and an output shaft hole 23b that penetrates the bottom wall portion 23 in the axial direction.

The rotor 30 has a shaft 31. The shaft 31 is centered on a central axis J extending in the up-down direction. The rotor 30 rotates around the central axis J together with the shaft 31. The lower end of the shaft 31 protrudes below the housing 20 through the output shaft hole 23b.

The upper bearing 33 and the lower bearing 34 support the shaft 31 rotatably around the central axis J. The lower bearing 34 is held by the bearing holder 23a below the stator 40. The upper bearing 33 is held by the upper housing 25 above the stator 40. The stator 40 is arranged radially outside of the rotor 30. The stator 40 has a coil 41. The stator 40 is fixed to an inner peripheral surface of the housing 20.

The upper housing 25 is a metal member made of aluminum or the like. The upper housing 25 has a heat sink portion 25a located above the lower housing 24, a connector holder 25b extending radially outward from the heat sink portion 25a, and a connector insertion hole 25c penetrating the connector holder 25b in the up-down direction.

The heat sink portion 25a is a thick plate. The controller 80 is disposed on the upper surface of the heat sink portion 25a. The controller 80 is thermally connected to the heat sink portion 25a via a heat transfer member not shown. The heat sink portion 25a dissipates heat transferred from the controller 80 and cools the controller 80. The heat sink portion 25a has a cylindrical bearing holder 25d opened to the lower surface. The upper bearing 33 is held inside the bearing holder 25d.

The heat sink portion 25a has a cylindrical portion 25e protruding downward from the lower surface. The cylindrical portion 25e is inserted into the upward opening 24a of the lower housing 24 from above. The heat sink portion 25a and the lower housing 24 are fastened by bolts not shown.

Figure 3:
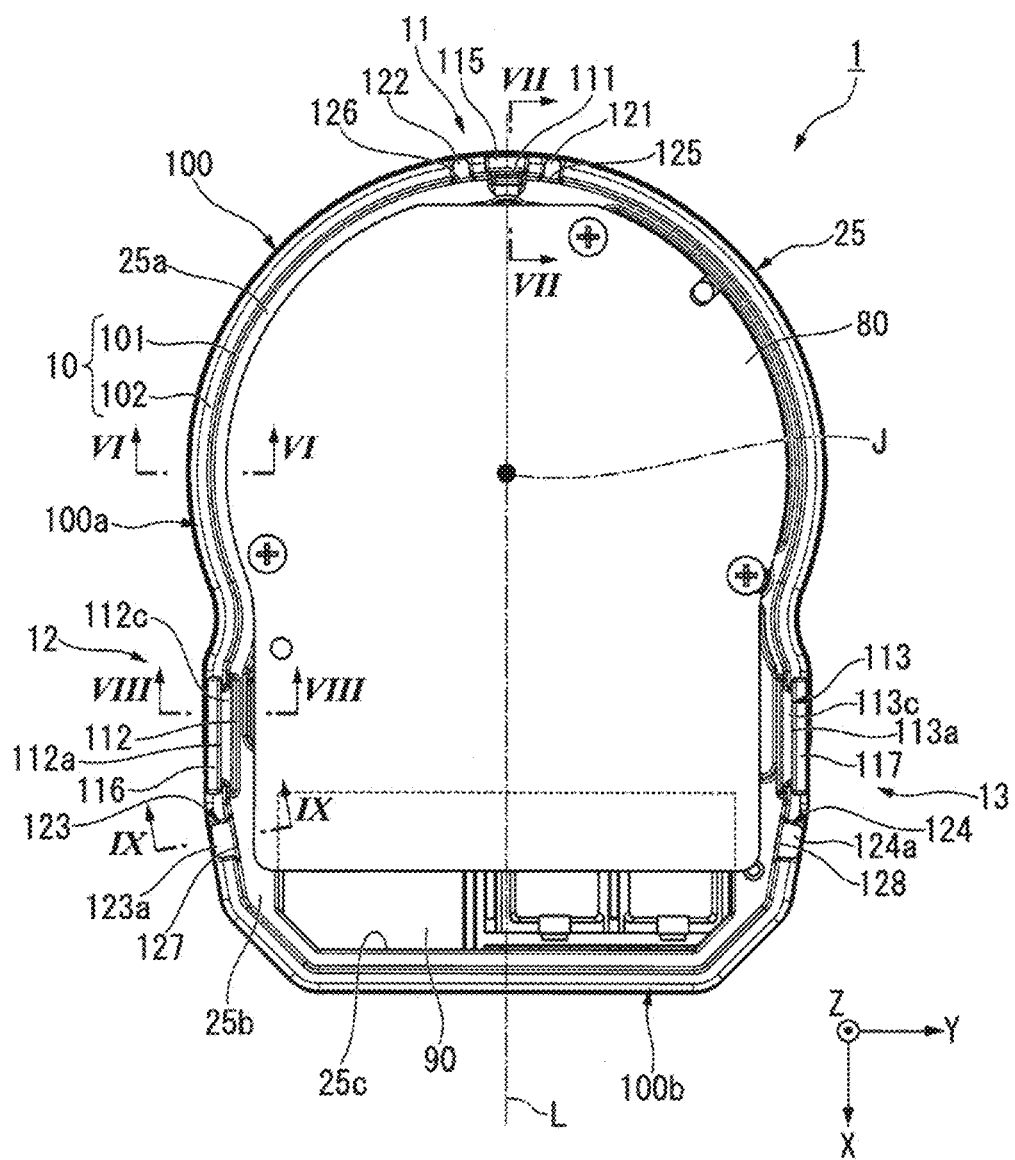
FIG. 3 is a plan view showing a state where a cover of a motor of an example embodiment of the present disclosure is removed.

The connector holder 25b protrudes radially outward from the outer peripheral surface of the cylindrical portion 21 from the heat sink portion 25a. The connector holder 25b has a substantially rectangular frame shape when viewed in the axial direction. The connector 90 is inserted into the connector insertion hole 25c of the connector holder 25b from below. As shown in FIG. 3, the connector 90 and the controller 80 partially overlap each other as viewed from above. The connector 90 and the controller 80 are electrically connected in a region where they overlap each other.

The upper housing 25 has a cover joint 100 on the outer peripheral surface at the upper end. The cover joint 100 extends in the circumferential direction on the outer peripheral surface of the upper housing 25. The cover joint 100 has an annular shape that goes around the outer peripheral surface of the upper housing 25. The cover joint 100 surrounds the controller 80 when viewed in the axial direction. As shown in FIG. 3, the cover joint 100 has an arc-shaped first portion 100a extending along the outer peripheral surface of the heat sink portion 25a, and a second portion 100b configured of a plurality of substantially linear sides extending along the outer peripheral surface of the connector holder 25b.

Figure 4:
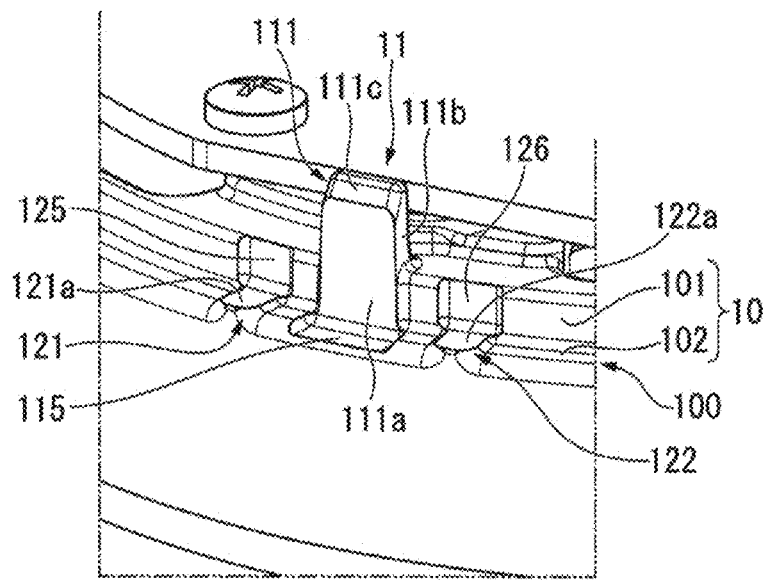
FIG. 4 is a partial perspective view showing a first positioning section.
Figure 5:
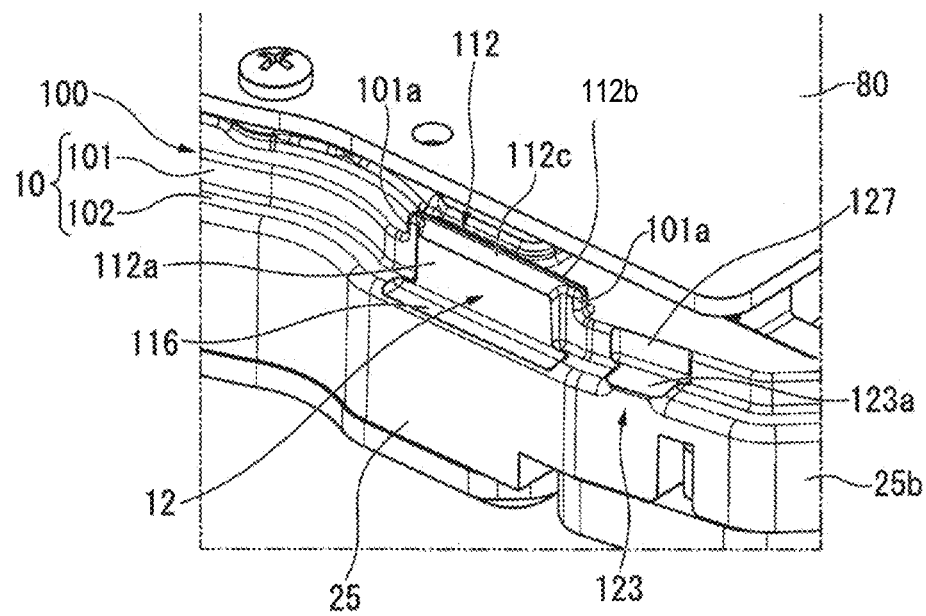
FIG. 5 is a partial perspective view showing a second positioning section.

The cover joint 100 has a stepped portion 10 located on the outer peripheral surface of the upper housing 25, as shown in FIGS. 3 to 5. The stepped portion 10 extends along the circumferential direction of the upper housing 25. The stepped portion 10 includes a first surface 101 facing radially outward, and an upward second surface 102 extending radially outward from the lower end of the first surface 101.

The cover joint 100 has a plurality of first wall portions 111, 112, and 113 protruding radially outward from the first surface 101. The first wall portions 111 to 113 are contact portions that come into contact with the cover 60 in the radial direction in the cover joint 100. The cover joint 100 has first recesses 115, 116, and 117 that are recessed downward from the second surface 102. The cover joint 100 has a plurality of second wall portions 121, 122, 123, and 124 protruding upward from the second surface 102. The cover joint 100 has second recesses 125, 126, 127, and 128 that are recessed radially inward from the first surface 101.

The first surface 101 is located between the first wall portions 111 to 113 and the second recesses 125 to 128 arranged at intervals in the circumferential direction. The second surface 102 is located between the second wall portions 121 to 124 and the first recesses 115 to 117 arranged at intervals in the circumferential direction.

As shown in FIG. 3, the cover joint 100 has a first positioning section 11, a second positioning section 12, and a third positioning section 13, for positioning the cover 60 with respect to the upper housing 25.

The first positioning section 11 is located on the opposite side of the connector 90 over the central axis J when viewed from above. The first positioning section 11 is located at an intermediate point of the first portion 100a of the cover joint 100. The first positioning section 11 is located at the end on the −X side of the upper housing 25. The cover joint 100 has a shape symmetrical with respect to a reference line L extending in the X-axis direction through the first positioning section 11 and the central axis J.

The second positioning section 12 and the third positioning section 13 are respectively located on the second portion 100b of the cover joint 100. The second positioning section 12 and the third positioning section 13 are located on side portions of the second portion 100b extending along the X-axis direction. The second positioning section 12 and the third positioning section 13 are arranged at line-symmetric positions with respect to the reference line L.

As shown in FIG. 4, the first positioning section 11 has a first wall portion 111, a first recess 115, second wall portions 121 and 122, and second recesses 125 and 126.

The first wall portion 111 has a wall surface 111a protruding radially outward from a first surface 101. The wall surface 111a is a surface facing the −X side. The first wall portion 111 has a guide protrusion 111b protruding above the first surface 101. That is, the cover joint 100 has the guide protrusion 111b. The wall surface 111a extends above the first surface 101. The upper end of the guide protrusion 111b is located above the upper surface of the controller 80, as shown in FIG. 1. The first wall portion 111 has a slope 111c at the upper end of the guide protrusion 111b, which is inclined downward toward the outside in the radial direction.

The first recess 115 is located below the first wall portion 111. The first recess 115 is a recess that opens upward and radially outward. The first recess 115 may be a recess that opens only upward. The circumferential width of the first recess 115 is larger than the circumferential width of the wall surface 111a of the first wall portion 111.

The second wall portions 121 and 122 are located on both sides of the first recess 115 in the circumferential direction. The second wall portions 121 and 122 have wall surfaces 121a and 122a protruding upward from the second surface 102. Part of the second surface 102 is arranged between the second wall portion 121 and the first recess 115 and between the second wall portion 122 and the first recess 115. That is, the second wall portions 121 and 122 are adjacent to each other in the circumferential direction via the first recess 115 and the second surface 102.

The second recesses 125 and 126 are recessed radially inward from the first surface 101 on the radially inner side of the second wall portions 121 and 122, respectively. The second recesses 125 and 126 are recesses that open radially outward and upward. The second recesses 125 and 126 may be recesses that open only radially outward. The circumferential width of the second recess 125 is larger than the circumferential width of the wall surface 121a. The circumferential width of the second recess 126 is larger than the circumferential width of the wall surface 122a.

The second recesses 125 and 126 are located on both sides of the first wall portion 111 in the circumferential direction. Part of the first surface 101 is arranged between the second recesses 125 and 126 and the first wall portion 111. That is, the second recesses 125 and 126 are circumferentially adjacent to the first wall portion 111 via the first surface 101.

As shown in FIG. 5, the second positioning section 12 includes a first wall portion 112, a first recess 116, a second wall portion 123, and a second recess 127. The first wall portion 112 has a wall surface 112a protruding radially outward from the first surface 101. The wall surface 112a is a surface facing the −Y side.

Figure 8:
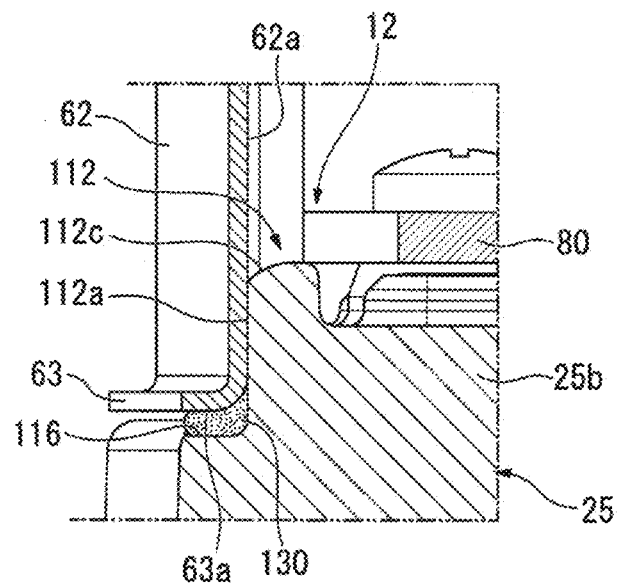
FIG. 8 is a partial sectional view showing a joint state between the second positioning section and the cover.
Figure 9:
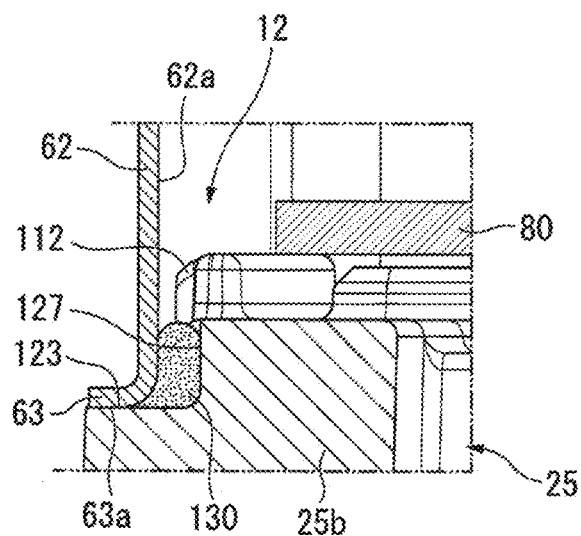
FIG. 9 is a partial sectional view showing a joint state between the second positioning section and the cover.

The first wall portion 112 has a protrusion 112b protruding above the first surface 101. In the present example embodiment, the upper end of the protrusion 112b is located near the side surface of the controller 80, as shown in FIG. 8. In the drawing, the upper end of the protrusion 112b is lower than the upper surface of the controller 80 and is located at substantially the same height. However, the upper end of the protrusion 112b may be located at a position slightly higher than the upper surface of the controller 80. The wall surface 112a extends above the first surface 101. The first wall portion 112 has a slope 112c at the upper end of the first wall portion 112. The slope 112c is inclined downward as it goes to the outside in the radial direction.

The second positioning section 12 has two upper protruding portions 101a extending laterally from a side surface of the protrusion 112b facing the circumferential direction. That is, the upper protruding portion 101a is adjacent to the first wall portion 112 that is a contact portion with the cover 60. The upper protruding portion 101a is located above the first surface 101. The surface facing outward in the radial direction of the upper protruding portion 101a continues to the first surface 101. That is, the upper protruding portion 101a is located radially inward of the first wall portion 112. The upper protruding portion 101a is opposed to the inner peripheral surface 62a of the cylindrical portion 62 via a gap in the radial direction. The motor 1 includes the upper protruding portion 101a on the side of the first wall portion 112, so that it is possible to suppress particles generated by rubbing between the cover 60 and the first wall portion 112 from entering the controller 80 side.

The first recess 116 is located below the first wall portion 112. The first recess 116 is a recess that opens upward and radially outward. The first recess 116 may be a recess that opens only upward. The circumferential width of the first recess 116 is larger than the circumferential width of the wall surface 112a of the first wall portion 112.

The second wall portion 123 is disposed at a position adjacent to the first recess 116 in the circumferential direction. The second wall portion 123 has a wall surface 123a protruding upward from the second surface 102. Part of the second surface 102 is arranged between the second wall portion 123 and the first recess 116. That is, the second wall portion 123 and the first recess 116 are adjacent to each other in the circumferential direction via the second surface 102.

The second recess 127 is recessed radially inward from the first surface 101 on the radially inner side of the second wall portion 123. The second recess 127 is a recess that opens radially outward and upward. The second recess 127 may be a recess that opens only radially outward. The circumferential width of the second recess 127 is larger than the circumferential width of the wall surface 123a.

The second recess 127 is arranged at a position adjacent to the first wall portion 112 in the circumferential direction. Part of the first surface 101 is arranged between the second recess 127 and the first wall portion 112. That is, the second recess 127 and the first wall portion 112 are adjacent to each other in the circumferential direction via the first surface 101.

As shown in FIG. 3, the third positioning section 13 has a first wall portion 113, a second wall portion 124, a first recess 117, and a second recess 128. The first wall portion 113, the second wall portion 124, the first recess 117, and the second recess 128 are respectively have the shape symmetrical with the first wall portion 112, the second wall portion 123, the first recess 116, and the second recess 127 of the second positioning section 12 with respect to the reference line L, and are disposed at positions symmetrical with respect to the reference line L. The third positioning section 13 has a configuration that is line-symmetric with that of the second positioning section 12. For example, as shown in FIG. 1, the first wall portion 113 has a wall surface 113a facing radially outward, and a slope 113c that extends downward toward the radially outer side at the upper end of the first wall portion 113.

The cover 60 covers the upper housing 25 from above. The cover 60 accommodates the controller 80 between the cover 60 and the upper housing 25. The cover 60 includes a top plate 61 that is disposed to face the controller 80 in the up-down direction, and a cylindrical portion 62 that extends downward from the outer peripheral end of the top plate 61. The cylindrical portion 62 of the cover 60 surrounds the controller 80 from the outside in the radial direction. The cylindrical portion 62 includes a flange portion 63 that extends radially outward from the lower end of the cylindrical portion 62.

The cover 60 is attached to the cover joint 100 in a state where the cover 60 is positioned at a predetermined position by the first positioning section 11, the second positioning section 12, and the third positioning section 13. Hereinafter, a joint portion between the cover 60 and the upper housing 25 will be described in detail while showing a process of mounting the cover 60. Note that the process of mounting the cover 60 described below is an example, and another mounting method may be adopted. For example, the application position of an adhesive 130 may be changed.

In the process of mounting the cover 60, first, the adhesive 130 is applied to the first surface 101 of the stepped portion 10 and to the first wall portions 111, 112, and 113. That is, the adhesive 130 is applied in an annular shape so as to make a round in the circumferential direction on the surface facing radially outward of the cover joint 100. Thus, the joint between the cover 60 and the upper housing 25 is bonded and sealed over the entire circumference in the circumferential direction by the adhesive 130. Therefore, the motor 1 is a motor having waterproofness.

In the first wall portions 111 to 113, the adhesive 130 is applied only to lower portions of the wall surfaces 111a to 113a that are in the same axial position as the first surface 101. Therefore, the adhesive 130 is not applied to the surface facing radially outward of the guide protrusion 111*b* of the first wall portion 111 and the surface facing radially outward of the protrusion 112*b* of the first wall portion 112. Similarly, the adhesive 130 is applied only to the lower portion of the first wall portion 113.

An operator that performs an assembly process disposes the cover 60 above the upper housing 25 with an opening of the cylindrical portion 62 facing downward. At the outer peripheral end of the upper surface of the upper housing 25, as shown in FIG. 1, the guide protrusion 111*b* of the first positioning section 11 protrudes upward to be the highest. The operator aligns the cover 60 and the upper housing 25 in the X-axis direction by bringing the inner peripheral surface 62*a* of the cylindrical portion 62 of the cover 60 into contact with the wall surface 111*a* of the guide protrusion 111*b*.

At this time, since the first wall portion 111 has the slope 111*c* at the upper end portion of the guide protrusion 111*b*, when the operator performs an operation of placing the cylindrical portion 62 of the cover 60 over the upper housing 25, the lower end of the cylindrical portion 62 slides the slope 111*c*, and the cylindrical portion 62 is guided to the wall surface 111*a*.

The operator moves the cover 60 in the horizontal direction in a state where the cover 60 is in contact with the guide protrusion 111*b*, and brings the cylindrical portion 62 of the cover 60 into contact with the first wall portion 112 of the second positioning section 12 and the first wall portion 112 of the third positioning section 13.

Since the adhesive 130 is not applied to the radially outer surface of the guide protrusion 111*b*, even if the operator moves the cover 60 for position adjustment, the adhesive 130 does not adhere to unnecessary parts and is not removed from the area to be bonded.

The operator pushes the cover 60 downward in a state where the cover 60 is aligned with the three positions, that is, the first positioning section 11, the second positioning section 12, and the third positioning section 13. Since the first wall portion 112 has the slope 112*c* at an upper end portion and the first wall portion 113 has the slope 113*c* at an upper end portion, the lower end of the cylindrical portion 62 that contacts the first wall portions 112 and 113 is guided to the wall surface 112*a* and the wall surface 113*a* by the slope 112*c* and the slope 113*c*, respectively.

In the case of the present example embodiment, the first wall portion 112 and the first wall portion 113 face opposite sides with the controller 80 interposed therebetween. The distance between the wall surface 112*a* and the wall surface 113*a* in the Y-axis direction is larger than the distance between the inner peripheral surfaces of the cover 60 in a portion that comes into contact with the first wall portions 112 and 113. With the above configuration, the cover 60 is press-fitted into the cover joint 100 at the first wall portion 112 and the first wall portion 113. That is, the cover 60 is fixed to the cover joint 100 in a state where the first wall portions 112 and 113 are pressed in the radial direction. According to this configuration, the cover 60 and the upper housing 25 can be fixed without using screws or snap fit. Since a portion such as a flange or a claw that protrudes radially outward from the cover 60 is not required, the motor 1 can be suppressed from being enlarged.

Since the first wall portions 112 and 113 serving as contact portions with the cover 60 protrude above the first surface 101 serving as an adhesive joint, the adhesive 130 is not applied to the upper portions of the first wall portions 112 and 113. Therefore, when the cover 60 is press-fitted into the upper portions of the first wall portions 112 and 113, the adhesive 130 does not adhere to the cover 60. Since the operator can position the cover 60 in a state where the adhesive 130 is not in contact with the cover 60, the assembly work is easy.

The operator holds the cover 60 in a horizontal posture while press-fitting the cover 60 into the upper portions of the first wall portions 112 and 113, and pushes the cover 60 further downward. The cover 60 moves while pushing the adhesive 130 in contact with the lower surface 63*a* of the flange portion 63 downward, and stops at a position where the lower surface 63*a* of the flange portion 63 abuts against the upper surfaces of the second walls 121 to 124.

On the surface facing radially outward of the cover joint 100, since the first wall portions 111 to 113 protrude radially outward from the first surface 101, the inner peripheral surface 62*a* of the cylindrical portion 62 contacts only the first wall portions 111 to 113. That is, the inner peripheral surface 62*a* of the cylindrical portion 62 and the first surface 101 face each other with a gap therebetween.

Figure 6:
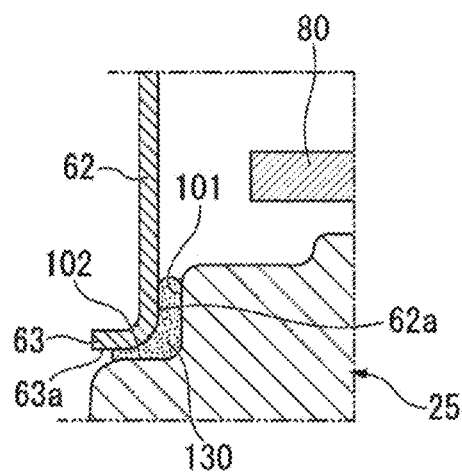
FIG. 6 is a partial sectional view showing a joint state between a cover joint and the cover.

Therefore, when the cover 60 moves downward, only part of the adhesive 130 on the first surface 101 on the radially outer side is pushed downward by the lower surface 63*a* of the flange portion 63, and the adhesive 130 adheres to the second surface 102. Thereby, as shown in FIG. 6, the lower surface 63*a* of the flange portion 63, which is the end surface facing the lower side of the cylindrical portion 62, and the second surface 102 are bonded via the adhesive 130. On the other hand, since the radially inner portion of the adhesive 130 remains on the first surface 101, the inner peripheral surface 62*a* of the cylindrical portion 62 and the first surface 101 are bonded via the adhesive 130.

As described above, in the motor 1, the first surface 101 and the second surface 102 of the stepped portion 10 and the opposing surface of the cover 60 opposing them are firmly bonded via the adhesive 130. According to this configuration, since the two surfaces of the stepped portion 10 are bonded, the path of entry of moisture and the like can be lengthened, and good sealing performance can be obtained in the cover joint 100.

Further, according to the present example embodiment, the cover 60 and the upper housing 25 can be bonded with sufficient strength without providing a groove in the cover joint 100. In the configuration in which the end of the cover is inserted into the groove of the housing, a wall portion of the housing is required outside the cover. However, in the present example embodiment, since the cover 60 is disposed outside the stepped portion 10, the outer shape of the housing 20 is unlikely to be increased.

In the first positioning section 11, the cover 60 is pushed downward from a state of being in contact with the wall surface 111*a*. Thus, the adhesive 130 on the wall surface 111*a* is pushed downward by the lower surface 63*a* of the flange portion 63. The adhesive 130 pushed down by the lower surface 63*a* is accommodated in the first recess 115 located below the first wall portion 111.

Since the wall surface 111*a* is located radially outward from the first surface 101, the proportion of the adhesive 130 carried downward by the lower surface 63*a* of the flange portion 63 is greater than the adhesive 130 on the first surface 101. If there is no recess below the first wall portion 111, the adhesive 130 pushed down by the flange portion 63 may protrude radially outward. Since the cover joint 100 has the first recess 115, the protrusion of the adhesive 130 can be suppressed.

When the inner peripheral surface 62*a* and the wall surface 111*a* come into contact with each other when the cover 60 moves downward, the cover 60 or the surface of the first wall portion 111 may be shaved to generate particles. In the present example embodiment, particles generated on the wall surface 111a are pushed into the first recess 115 together with the adhesive 130 by the lower surface 63a of the flange portion 63. Further, since the adhesive 130 is also provided on the side of the wall surface 111a, the particles are fixed to the adhesive 130. That is, in the present example embodiment, an adhesive joint where the cover 60 and the first surface 101 are bonded is disposed on the side of the first wall portion 111 which is a contact portion with the cover 60. According to this configuration, it is possible to suppress particles from entering the controller 80 side.

Figure 7:
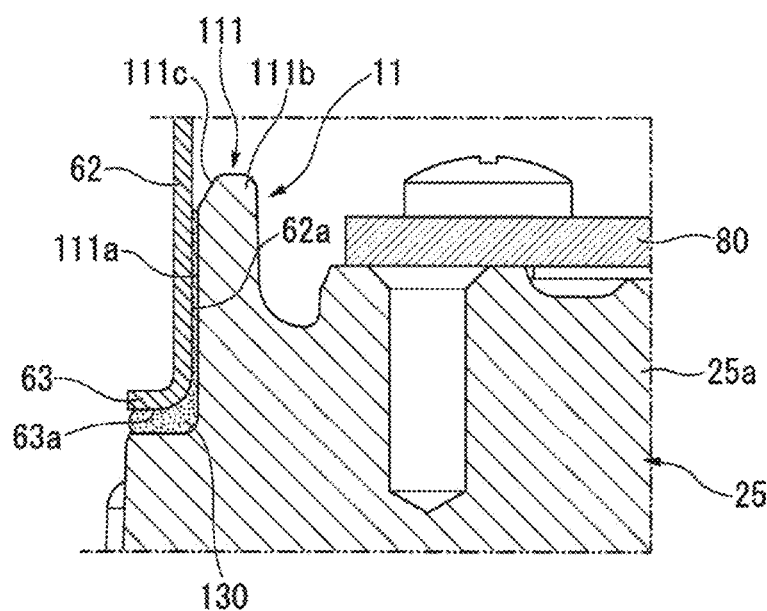
FIG. 7 is a partial sectional view showing a joint state between the first positioning section and the cover.

Note that as shown in FIG. 3, the upper housing 25 has no positioning mechanism at the end opposite to the first positioning section 11 in the X-axis direction. Therefore, the cover 60 can slightly move in the X-axis direction, and the inner peripheral surface 62a of the cylindrical portion 62 may separate from the wall surface 111a in the process of pushing the cover 60 downward by the operator. In that case, since part of the adhesive 130 on the wall surface 111a remains without being removed by the flange portion 63, as shown in FIG. 7, the inner peripheral surface 62a and the wall surface 111a that face each other in the radial direction are bonded by the adhesive 130 on the wall surface 111a.

The first positioning section 11 has second wall portions 121 and 122. The lower surface 63a of the flange portion 63 contacts the wall surfaces 121a and 122a of the second wall portions 121 and 122. Thereby, the cover 60 is positioned on the upper housing 25 in the axial direction.

In the process of moving the cover 60 downward, part of the adhesive 130 is moved downward by the lower surface 63a of the flange portion 63. If a large amount of the adhesive 130 is disposed between the lower surface 63a and the wall surfaces 121a and 122a, the adhesive 130 on the second wall portions 121 and 122 is likely to protrude outside the flange portion 63.

In the present example embodiment, the cover joint 100 has a second recess 125 on the radially inner side of the second wall portion 121, and has the second recess 126 on the radially inner side of the second wall portion 122. According to this configuration, the radially protruding amount of the adhesive 130 applied to the second recesses 125 and 126 is smaller than that of the adhesive 130 applied to the first surface 101. Thus, the amount of the adhesive 130 carried downward by the lower surface 63a of the flange portion 63 is reduced. As a result, the amount of the adhesive 130 interposed between the lower surface 63a and the wall surfaces 121a and 122a is reduced, and the protrusion of the adhesive 130 from the flange portion 63 to the outside is suppressed.

In the second positioning section 12 and the third positioning section 13, the cover 60 is pushed downward in a state of being in contact with the wall surfaces 112a and 113a of the first wall portions 112 and 113. Thereby, the adhesive 130 on the wall surfaces 112a and 113a is pushed downward by the lower surface 63a of the flange portion 63. The adhesive 130 pushed down by the lower surface 63a is accommodated in the first recesses 116 and 117 located below the first wall portions 112 and 113 respectively.

As shown in FIG. 8, the wall surface 112a of the first wall portion 112 and the inner peripheral surface 62a of the cylindrical portion 62 are opposed to each other in the radial direction and contact each other. Since the cover 60 is press-fitted into the first wall portions 112 and 113, the adhesive 130 hardly intervenes between the wall surfaces 112a and 113a and the inner peripheral surface 62a. On the other hand, the first surface 101 is disposed on both circumferential sides of the first wall portion 112. Between the first surface 101 and the inner peripheral surface 62a of the cylindrical portion 62, as shown in FIG. 6, the inner peripheral surface 62a and the first surface 101 are bonded via the adhesive 130.

According to the above configuration, at the time of mounting the cover 60 on the upper housing 25, particles generated by rubbing between the cylindrical portion 62 and the first wall portions 112 and 113 can be moved below the first wall portions 112 and 113 together with the adhesive 130 by the lower surface 63a of the flange portion 63, and fixed together with the adhesive 130. Further, since the first surface 101 that is an adhesive joint with the cylindrical portion 62 is located on the side of the first wall portions 112 and 113, particles that have moved to the side of the first wall portions 112 and 113 are also adsorbed to the adhesive 130. Accordingly, it is possible to prevent particles generated in the first wall portions 112 and 113 from entering the controller 80.

In the present example embodiment, as shown in FIG. 8, the first wall portions 112 and 113 have upper ends located near the side surfaces of the controller 80, and slopes 112c and 113c that are inclined downward toward the outside in the radial direction. According to this configuration, even if some of the particles generated on the wall surfaces 112a and 113a are not adsorbed to the adhesive 130, the particles are unlikely to move to the upper surface of the controller 80.

In the present example embodiment, in the second positioning section 12 and the third positioning section 13, the cover joint 100 has the first recesses 116 and 117 below the first wall portions 112 and 113, respectively. With this configuration, the adhesive 130 pushed downward from the wall surfaces 112a and 113a can be suppressed from protruding outside the flange portion 63.

The second positioning section 12 has the second wall portion 123, and the third positioning section 13 has the second wall portion 124. The lower surface 63a of the flange portion 63 contacts the wall surfaces 123a and 124a of the second wall portions 123 and 124 in the axial direction. Thereby, the cover 60 is positioned on the upper housing 25 in the axial direction.

The cover joint 100 has the second recess 127 radially inside the second wall portion 123, and has the second recess 128 radially inside the second wall portion 124. According to this configuration, the protruding amount in the radially outer side of the adhesive 130 applied to the second recesses 127 and 128 is smaller than that of the adhesive 130 applied to the first surface 101. Thus, the amount of the adhesive 130 carried downward by the lower surface 63a of the flange portion 63 is reduced. As a result, the amount of the adhesive 130 interposed between the lower surface 63a and the wall surfaces 123a and 124a is reduced, and the protrusion of the adhesive 130 from the flange portion 63 to the outside is suppressed.

The cover joint 100 has the first wall portions 111 to 113 as shown in FIG. 3. The first wall portions 111 to 113 are arranged apart from each other in the direction in which the cover joint 100 extends. The surfaces of the first wall portions 111 to 113 facing in the radial direction are arranged in different directions. Specifically, the wall surface 111a is disposed facing the −X side, the wall surface 112a is disposed facing the −Y side, and the wall surface 113a is disposed facing the +Y side. According to this configuration, the cover 60 and the upper housing can be easily and accurately aligned by contacting the differently oriented wall surfaces 111a to 113a with the inner peripheral surface 62a of the cylindrical portion 62. Thereby, the workability of assembling the motor 1 is improved.

The cover joint 100 has the four second wall portions 121 to 124. The flange portion 63 of the cover 60 contacts three of more of the second wall portions 121 to 124, whereby it is positioned on a plane defined by the second wall portions 121 to 124. According to this configuration, the interval between the flange portion 63 and the second surface 102 can be made uniform in the circumferential direction. Thereby, the thickness of the adhesive 130 in the up-down direction can be made uniform, whereby good sealing properties can be obtained. Also, protrusion of the adhesive 130 can be suppressed. Further, since the cover 60 and the upper housing 25 can be easily positioned, the workability of assembling the motor 1 is improved.

In the first positioning section 11, the first wall portion 111 and the two second wall portions 121 and 122 are arranged adjacent to each other in the circumferential direction. In the second positioning section 12, the first wall portion 112 and the second wall portion 123 are arranged adjacent to each other in the circumferential direction. In the third positioning section 13, the first wall portion 113 and the second wall portion 124 are arranged adjacent to each other in the circumferential direction. That is, the cover joint 100 has a plurality of positioning sections in which the first wall portions 111 to 113 and the second wall portions 121 to 124 are arranged adjacent to each other in the circumferential direction.

According to the above configuration, since the positioning mechanisms in the radial direction and the axial direction are arranged close to each other, the adhesive 130 is unlikely to protrude or have an uneven thickness. For example, the adhesive 130 on the first wall portion 111 is pushed downward by the flange portion 63, but since the second wall portions 121 and 122 are arranged on both sides below the first wall portion 111, the flange portion 63 stops at a position where it abuts the second wall portions 121 and 122, and does not move downward any more. Since it is possible to prevent the flange portion 63 from being excessively pushed down, it is possible to suppress the adhesive 130 from protruding below the first wall portion 111 and to prevent the thickness thereof from becoming uneven.

Further, the amount of the adhesive 130 interposed between the second wall portions 121 and 122 and the flange portion 63 depends on the intervals in the radial direction between the second recesses 125 and 126 and the cylindrical portion 62 when the cover 60 moves downward. For example, when the cylindrical portion 62 passes through a position near the first surface 101, the amount of the adhesive 130 scraped off by the flange portion 63 increases. Then, the amount of the adhesive 130 interposed between the flange portion 63 and the second wall portions 121 and 122 increases, and the adhesive 130 easily protrudes outward in the radial direction of the flange portion 63.

On the other hand, in the present example embodiment, since the first wall portion 111 is arranged near the second wall portions 121 and 122, the distance between the cylindrical portion 62 and the first surface 101 is maintained to be equal to or larger than the protruding height in the radial direction of the first wall portion 111. Thereby, the scraping amount of the adhesive 130 by the flange portion 63 can be reduced, and the protrusion of the adhesive 130 is suppressed. In addition, unevenness in the thickness of the adhesive 130 between the cylindrical portion 62 and the first surface 101 can be suppressed.

In the first positioning section 11, the first wall portion 111 and the second recesses 125 and 126 are arranged adjacent to each other in the circumferential direction, and the first recess 115 and the second wall portions 121 and 122 are arranged adjacent to each other in the circumferential direction. According to this configuration, the adhesive 130 that is extruded in the circumferential direction from above the first wall portion 111 by the cylindrical portion 62 can escape to the second recesses 125 and 126. Further, the adhesive 130 that is extruded in the circumferential direction from above the second wall portions 121 and 122 by the flange portion 63 can escape to the first recess 115. By these actions, the protrusion of the adhesive 130 to the outside in the radial direction of the cover 60 can be suppressed.

Further, in the second positioning section 12, the first wall portion 112 and the second recess 127 are disposed adjacent to each other in the circumferential direction, and the first recess 116 and the second wall portion 123 are disposed adjacent to each other in the circumferential direction. In the third positioning section 13, the first wall portion 113 and the second recess 128 are arranged adjacent to each other in the circumferential direction, and the first recess 117 and the second wall portion 124 are arranged adjacent to each other in the circumferential direction. In the second positioning section 12 and the third positioning section 13, as in the case of the first positioning section 11, the wall portion and the recess are arranged adjacent to each other in the circumferential direction, so that the adhesive 130 can be prevented from protruding.

Figure 10:
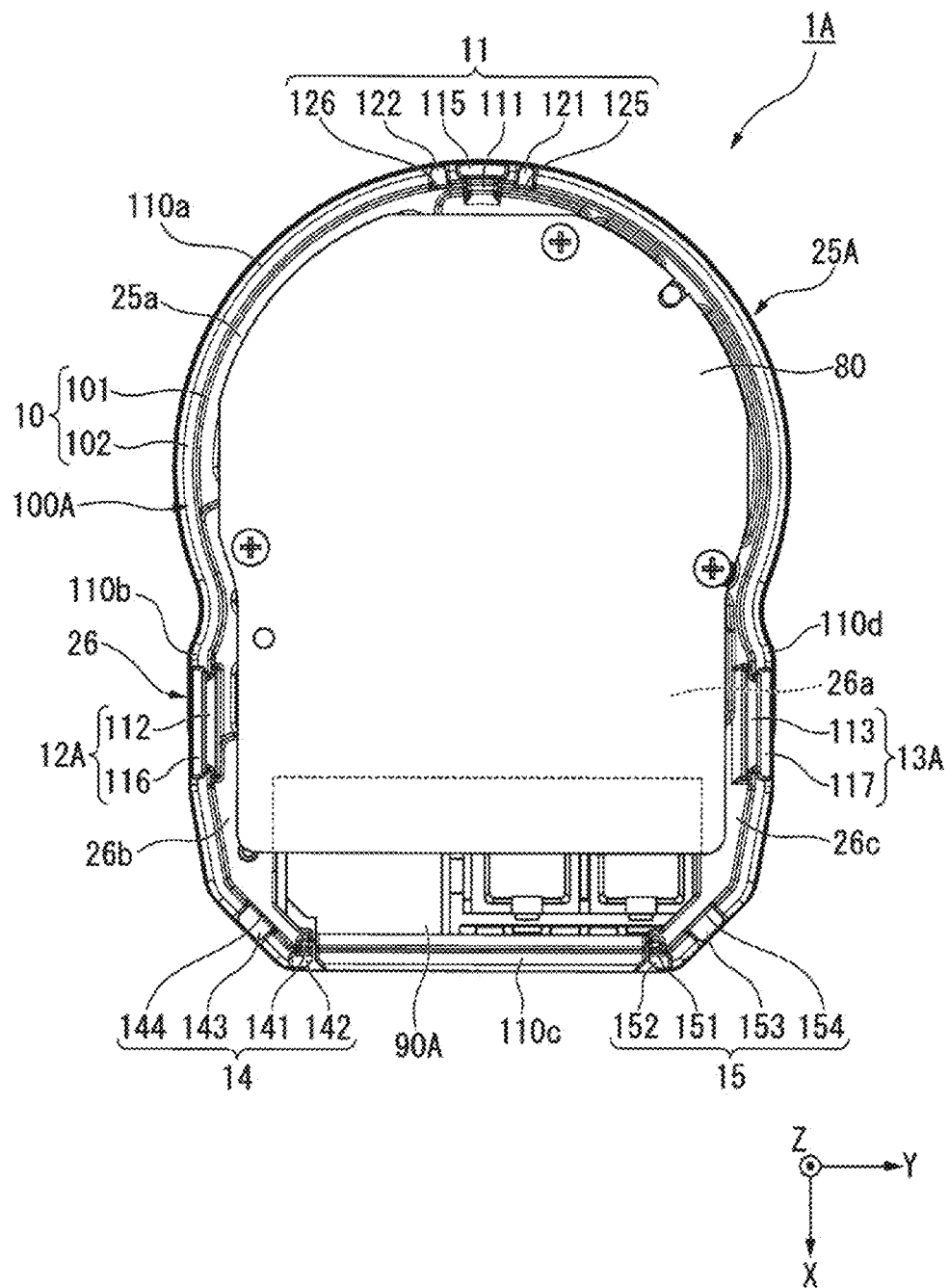
FIG. 10 is a plan view of a motor according to a modified example of the present disclosure.

FIG. 10 is a plan view showing a motor 1A of a modified example. The motor 1A has an upper housing 25A and a connector 90A. The configuration of the motor 1A other than the upper housing 25A and the connector 90 is common to that of the motor 1 shown in FIGS. 1 to 9.

The upper housing 25A is a metal member made of aluminum or the like. The upper housing 25A has a heat sink portion 25a located above the lower housing 24, and a connector holder 26 extending radially outward from the heat sink portion 25a. The connector holder 26 has a base end 26a protruding radially outward in the X-axis direction from the heat sink portion 25a, and two arm portions 26b and 26c protruding radially outward on the +X side from both ends in the Y-axis direction of the base end 26a.

The two arm portions 26b and 26c are arranged with a space between them in the Y-axis direction. The connector 90A is inserted between the two arm portions 26b and 26c from below. A side surface of the connector 90A facing radially outward on the +X side is exposed between the arm portions 26b and 26c.

The upper housing 25A has a cover joint 100A on the outer peripheral surface at the upper end. The cover joint 100A extends circumferentially on the outer peripheral surfaces of the upper housing 25A and the connector 90A. The cover joint 100A is in an annular shape that surrounds the outer peripheral surfaces of the upper housing 25A and the connector 90A, and surrounds the controller 80 when viewed in the axial direction. The cover joint 100A has an arc-shaped first portion 110a extending along the outer peripheral surface of the heat sink portion 25a, a bent line-shaped second portion 110b extending along the outer peripheral surface of the arm portion 26b of the connector holder 26, a linear third portion 110c extending along the outer peripheral surface of the connector 90A, and a polygonal fourth portion 110d extending along the outer peripheral surface of the arm portion 26c.

The cover joint 100A has a stepped portion 10 located on the outer peripheral surface of the upper housing 25A and the connector 90A. The stepped portion 10 includes a first surface 101 extending radially outward along the circumferential direction, and an upward second surface 102 extending radially outward from a lower end of the first surface 101. The first surface 101 and the second surface 102 each include a portion located on the outer peripheral surface of the upper housing 25A and a portion located on the outer peripheral surface of the connector 90A.

The cover joint 100A has a first positioning section 11, a second positioning section 12A, a third positioning section 13A, a fourth positioning section 14, and a fifth positioning section 15. The second positioning section 12A includes a first wall portion 112 and a first recess 116. The third positioning section 13A includes a first wall portion 113 and a first recess 117.

The fourth positioning section 14 is located at distal end in the direction in which the arm portion 26b extends. The fourth positioning section 14 has a first wall portion 141, a first recess 142, a second wall portion 143, and a second recess 144.

The first wall portion 141 protrudes radially outward on the +X side from the first surface 101 at the distal end of the arm portion 26b. The first recess 142 is located below the first wall portion 141. The first recess 142 is recessed downward from the second surface 102. The second wall portion 143 is located between the first recess 142 and the first recess 116 of the second positioning section 12A in the circumferential direction. The second wall portion 143 protrudes upward from the second surface 102. The second recess 144 is positioned on the radially inner side of the second wall portion 143. The second recess 144 is recessed radially inward from the first surface 101. The second recess 144 is located between the first wall portion 141 and the first wall portion 112 in the circumferential direction.

The fifth positioning section 15 is located at the distal end in the direction that the arm 26c extends. The fifth positioning section 15 has a first wall portion 151, a first recess 152, a second wall portion 153, and a second recess 154.

The first wall portion 151 protrudes radially outward on the +X side from the first surface 101 at the tip of the arm portion 26c. The first recess 152 is located below the first wall portion 151. The first recess 152 is recessed downward from the second surface 102. The second wall portion 153 is located between the first recess 152 and the first recess 117 of the third positioning section 13A in the circumferential direction. The second wall portion 153 protrudes upward from the second surface 102. The second recess 154 is positioned on the radially inner side of the second wall portion 153. The second recess 154 is recessed radially inward from the first surface 101. The second recess 154 is located between the first wall portion 151 and the first wall portion 113 in the circumferential direction.

In the motor 1A of the modified example, the cover 60 is positioned in the X-axis direction with respect to the upper housing 25A by the first wall portion 111 of the first positioning section 11, the first wall portion 141 of the fourth positioning section 14, and the first wall portion 151 of the fifth positioning section 15. In the second positioning section 2A and the third positioning section 13B, the cylindrical portion 62 of the cover 60 is press-fitted into the first wall portions 112 and 113. As a result, the cover 60 is positioned and fixed in the Y-axis direction with respect to the upper housing 25.

In the motor 1A of the modified example 1, the first wall portion 111 of the first positioning section 11, the first wall portion 141 of the fourth positioning section 14, and the first wall portion 151 of the fifth positioning section 15 face opposite side each other in the X-axis direction. Thereby, the cover 60 can be positioned with higher accuracy in the X-axis direction. In the fourth positioning section 14 and the fifth positioning section 15, similar to the first positioning section described in the above example embodiment, the effect of suppressing protrusion of the adhesive 130 to the outside of the cover 60 and the effect of suppressing non-uniform thickness of the adhesive 130 are achieved.

Although the example embodiments of the present disclosure have been described above, the structures described in the example embodiments and the combinations of the elements are merely examples, and therefore addition, omission, substation and other alterations may be appropriately made within the scope of the present disclosure.

For example, in the above-described example embodiment, the cover joint 100 or 100A is located on the outer peripheral surface of the upper housing 25 or 25A, and the cylindrical portion 62 of the cover 60 surrounds the cover joint 100 or 100A from radially outside. The cover joint 100 or 100A may be arranged on the inner peripheral surface of the upper housing 25 or 25A, and the cylindrical portion 62 of the cover 60 may be arranged radially inside the cover joint 100 or 100A.

Also in this configuration, since the first surface 101 and the second surface 102 of the stepped portion 10 of the cover joint 100 or 100A and a plurality of surfaces of the cylindrical portion 62 are bonded, good sealing performance can be obtained. In addition, particles generated when the cover 60 is attached to the cover joint 100 or 100A are also adsorbed by the adhesive 130 located on the side of the first wall portions 111 to 113, so that particles are prevented from entering the inside of the motor.

Features of the above-described preferred example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:
1. A motor comprising:
   a motor main body including a rotor and a stator, the rotor and the stator being centered on a central axis extending in an up-down direction;
   a housing that houses the motor main body;
   a controller that is located above the motor main body to control rotation of the rotor; and
   a cover that surrounds the controller from a radially outer side; wherein
   the housing includes a cover joint that has an annular shape and surrounds the controller when viewed in an axial direction;
   the cover includes a cylindrical portion that surrounds the cover joint from an outside in a radial direction;
   the cover joint includes a contact portion that comes into contact with a surface of the cylindrical portion in the radial direction and an adhesive joint that is bonded with the cylindrical portion via an adhesive in the radial direction;
   the contact portion and the adhesive joint are adjacent each other in a circumferential direction; and
   the cover joint includes:
      a stepped portion including a first surface opposing the radial direction and a second surface opposing upward and radially extending from a lower end of the first surface; and a first recess is recessed downward from the second surface below the contact portion.

2. The motor according to claim 1, wherein the cover joint includes a region that is bonded in the up-down direction below the contact portion with an end surface, facing downward, of the cover.

3. The motor according to claim 1, wherein the cover is fixed to the cover joint in a state where the contact portion is pressed from an outside in the radial direction.

4. The motor according to claim 1, wherein the adhesive seals the cover joint of the cover and the housing.

5. The motor according to claim 1, wherein
the controller includes a control board that extends in a direction intersecting with the axial direction; and
the contact portion is located below the control board.

6. The motor according to claim 1, wherein the contact portion protrudes above the adhesive joint.

7. The motor according to claim 6, wherein the contact portion includes a slope at an upper end, the slope being inclined downward toward an outside in the radial direction.

8. The motor according to claim 1, wherein the contact portion protrudes radially outward from the adhesive joint adjacent to the contact portion in a circumferential direction.

9. The motor according to claim 1, wherein the cover joint includes an upper protruding portion that opposes an inner peripheral surface of the cylindrical portion via a gap in the radial direction at a position above the adhesive joint.

10. The motor according to claim 1, wherein the cover joint includes a stepped portion on a side surface of the housing, and a guide protrusion that extends upward from the stepped portion and opposes an inner peripheral surface of the cylindrical portion.

11. The motor according to claim 10, wherein the guide protrusion includes a slope at an upper end, the slope is inclined downward toward an outside in the radial direction.

12. The motor according to claim 1, wherein the cover joint includes:
a stepped portion including a first surface opposing the radial direction and a second surface opposing upward and radially extending from a lower end of the first surface; and
a first recess that is recessed downward from the second surface below the contact portion.

13. The motor according to claim 1, wherein the cover joint includes:
a stepped portion including a first surface opposing the radial direction and a second surface opposing upward and radially extending from a lower end of the first surface; and
a second wall portion that protrudes upward from the second surface; and
the second wall portion contacts an end surface, facing downward, of the cylindrical portion.

14. The motor according to claim 13, wherein the cover joint includes a second recess that is recessed radially inward from the first surface on a radially inner side of the second wall portion.

15. The motor according to claim 1, wherein the cover joint includes:
a stepped portion including a first surface opposing the radial direction and a second surface opposing upward and radially extending from a lower end of the first surface;
the contact portion protrudes radially outward from the first surface to contact the surface of the cylindrical portion in the radial direction;
a first recess that is recessed downward from the second surface below the contact portion;
a second wall portion that protrudes upward from the second surface and contacts an end surface, facing downward, of the cylindrical portion; and
a second recess that is recessed radially inward from the first surface on the radially inner side of the second wall portion;
the contact portion and the second recess are adjacent in the circumferential direction; and
the first recess and the second wall portion are adjacent in the circumferential direction.

16. A motor comprising:
a motor main body including a rotor and a stator, the rotor and the stator being centered on a central axis extending in an up-down direction;
a housing that houses the motor main body;
a controller that is located above the motor main body to control rotation of the rotor; and
a cover that surrounds the controller from a radially outer side; wherein
the housing includes a cover joint that is an annular shape and surrounds the controller when viewed in an axial direction;
the cover includes a cylindrical portion that surrounds the cover joint from an outside in a radial direction;
the cover joint includes a contact portion that comes into contact with a surface of the cylindrical portion in the radial direction and an adhesive joint that is bonded with the cylindrical portion via an adhesive in the radial direction;
the contact portion and the adhesive joint are adjacent each other in a circumferential direction;
the cover joint includes:
a stepped portion including a first surface opposing the radial direction and a second surface opposing upward and radially extending from a lower end of the first surface; and
a second wall portion that protrudes upward from the second surface; and
the second wall portion contacts an end surface, facing downward, of the cylindrical portion; and
the cover joint includes a second recess that is recessed radially inward from the first surface on a radially inner side of the second wall portion.

17. A motor comprising:
a motor main body including a rotor and a stator, the rotor and the stator being centered on a central axis extending in an up-down direction;
a housing that houses the motor main body;
a controller that is located above the motor main body to control rotation of the rotor; and
a cover that surrounds the controller from a radially outer side; wherein
the housing includes a cover joint that is an annular shape and surrounds the controller when viewed in an axial direction;
the cover includes a cylindrical portion that surrounds the cover joint from an outside in a radial direction;
the cover joint includes a contact portion that comes into contact with a surface of the cylindrical portion in the radial direction and an adhesive joint that is bonded with the cylindrical portion via an adhesive in the radial direction;
the contact portion and the adhesive joint are adjacent each other in a circumferential direction;
the cover joint includes:

a stepped portion including a first surface opposing the radial direction and a second surface opposing upward and radially extending from a lower end of the first surface;
the contact portion protrudes radially outward from the first surface to contact the surface of the cylindrical portion in the radial direction;
a first recess that is recessed downward from the second surface below the contact portion;
a second wall portion that protrudes upward from the second surface and contacts an end surface, facing downward, of the cylindrical portion; and
a second recess that is recessed radially inward from the first surface on the radially inner side of the second wall portion;

the contact portion and the second recess are adjacent in the circumferential direction; and the first recess and the second wall portion are adjacent in the circumferential direction.

\* \* \* \* \*